US012750223B1

(12) United States Patent
Stapleton et al.

(10) Patent No.: US 12,750,223 B1
(45) Date of Patent: Sep. 29, 2026

(54) QR CODE CRYPTOGRAPHIC PROTECTION

(71) Applicant: Wells Fargo Bank, N.A., San Francisco, CA (US)

(72) Inventors: Jeffrey J. Stapleton, O'Fallon, MO (US); Peter Bordow, Fountain Hills, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 231 days.

(21) Appl. No.: 18/111,378

(22) Filed: Feb. 17, 2023

(51) Int. Cl.
*H04L 29/06* (2006.01)
*H04L 9/08* (2006.01)
*H04L 9/32* (2006.01)

(52) U.S. Cl.
CPC .......... *H04L 9/3213* (2013.01); *H04L 9/0825* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 10,002,277 | B1* | 6/2018 | Endress | G06K 7/1417 |
| 2018/0211718 | A1* | 7/2018 | Heath | G16H 80/00 |
| 2019/0066089 | A1* | 2/2019 | Miryala | G06Q 20/367 |
| 2019/0200218 | A1* | 6/2019 | Redberg | H04L 9/12 |
| 2019/0384934 | A1* | 12/2019 | Kim | H04L 9/0866 |
| 2020/0134598 | A1* | 4/2020 | Mandaara | G06Q 20/322 |
| 2020/0145826 | A1* | 5/2020 | Katz | G06K 7/1417 |
| 2020/0151702 | A1* | 5/2020 | Sinha | G06Q 20/3224 |
| 2020/0175207 | A1* | 6/2020 | Cheng | G06F 21/6236 |
| 2020/0284883 | A1* | 9/2020 | Ferreira | G01S 7/4815 |
| 2021/0067536 | A1* | 3/2021 | Mylrea | H04L 9/3239 |
| 2021/0158039 | A1* | 5/2021 | Dittmann | G06F 21/78 |
| 2021/0366014 | A1* | 11/2021 | Wang | G06F 21/36 |
| 2021/0377254 | A1* | 12/2021 | Avetisov | H04L 67/133 |
| 2022/0020101 | A1* | 1/2022 | Barman | G06Q 20/24 |
| 2022/0147648 | A1* | 5/2022 | Babcock | G06F 21/6245 |
| 2022/0147966 | A1* | 5/2022 | Babcock | G06Q 20/405 |
| 2022/0201492 | A1* | 6/2022 | Park | H04L 63/0861 |
| 2023/0065342 | A1* | 3/2023 | Chu | G06Q 20/405 |
| 2023/0092823 | A1* | 3/2023 | Tosswill | G06Q 30/0201 705/14.49 |
| 2023/0344648 | A1* | 10/2023 | Goodman | H04L 9/0897 |
| 2024/0031172 | A1* | 1/2024 | Yamada | H04L 9/50 |
| 2024/0080315 | A1* | 3/2024 | Ravuna | H04L 63/0838 |
| 2024/0095482 | A1* | 3/2024 | Williams | G06K 19/06037 |

* cited by examiner

*Primary Examiner* — Ali H. Cheema
*Assistant Examiner* — Hassan A Hussein
(74) *Attorney, Agent, or Firm* — Foley & Lardner LLP

(57) ABSTRACT

The present disclosure is directed to systems, methods, and non-transitory computer-readable media including storing, by a server, cryptographically protected information related to a bar code, the information configured to be accessible via at least one link to the cryptographically protected information. The server determines that the at least one link is accessed by the bar code being read. The server sends to a receiver device the cryptographically protected information.

19 Claims, 3 Drawing Sheets

```
SignedData ::= SEQUENCE {
    Version              CMSVersion,
    digestAlgorithms     DigestAlgorithmIdentifiers,
    encapContentInfo     EncapsulatedContentInfo,
    certificates         [0] Certificates OPTIONAL,
    crls                 [1] CRLs OPTIONAL,
    signerInfos          SignerInfos
}
```

FIG. 2

```
SignerInfos ::= SET SIZE(0..MAX) OF SignerInfo

SignerInfo ::= SEQUENCE {
    Version              CMSVersion,
    Sid                  SignerIdentifier,
    digestAlgorithm      DigestAlgorithmIdentifier,
    signedAttrs          [0] SignedAttributes OPTIONAL,
    signatureAlgorithm   SignatureAlgorithmIdentifier,
    signature            SignatureValue,
    unsignedAttrs        [1] UnsignedAttributes OPTIONAL
}
```

FIG. 3

QR CODE CRYPTOGRAPHIC PROTECTION

BACKGROUND

Conventional Quick Response (QR) codes do not provide data protection using cryptographic solutions. While the QR code may be protected as a data element within a message, the QR code scheme lacks any mechanism for protecting the QR code from modification, duplication, or masquerading.

SUMMARY

The arrangements disclosed herein relate to systems, methods, non-transitory computer-readable media, and apparatuses, including storing, by a server, cryptographically protected information related to a bar code, the information being configured to be accessible via at least one link to the cryptographically protected information, determining, by the server, that the at least one link is accessed by the bar code being read, and sending, by the server to a receiver device, the cryptographically protected information.

In some arrangements, a processing circuit includes a processor and a memory, the processing circuit configured to store cryptographically protected information related to a bar code, the information being configured to be accessible via at least one link to the cryptographically protected information, determine that the at least one link is accessed by the bar code being read, and send to a receiver device the cryptographically protected information.

In some arrangements, a processor is caused to store cryptographically protected information related to a bar code, the information being configured to be accessible via at least one link to the cryptographically protected information, determine that the at least one link is accessed by the bar code being read, and send to a receiver device the cryptographically protected information.

These and other features, together with the organization and manner of operation thereof, will become apparent from the following detailed description when taken in conjunction with the accompanying drawings.

BRIEF DESCRIPTION OF THE DRAWINGS

FIG. 2 illustrates a format of signed data, according to some arrangements.

FIG. 3 illustrates a format of signer information of signed data, according to some arrangements.

DETAILED DESCRIPTION

Referring generally to the FIGS., the arrangements disclosed herein relate to systems, methods, non-transitory computer-readable media, and apparatuses for providing cryptographic protection for QR codes. A detached or separated scheme can be implemented to cryptographically protect QR codes using Cryptographic Syntax Message (CMS). A QR code can contain one or more links to one or more CMS-based objects or cryptographically protected information that provide data protection (e.g., data encryption, message authentication, digital signatures, and so on) and associated key management information (e.g., certificates and so on).

Figure 1:
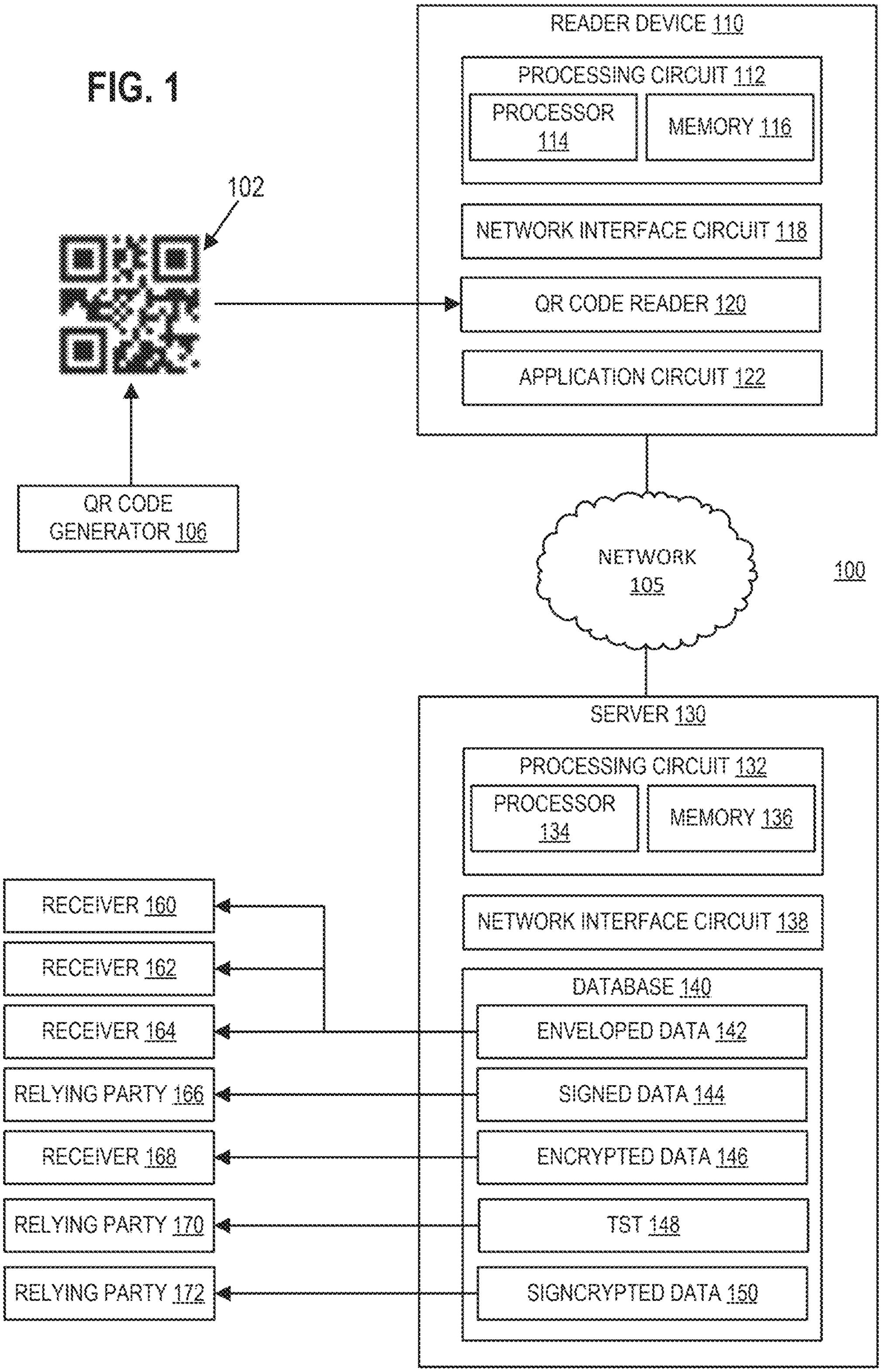
FIG. 1 is a block diagram of a system configured to implement a QR code cryptographic protection, according to some arrangements.

FIG. 1 is a block diagram of a system 100 configured to implement a QR code cryptographic protection, according to some arrangements. The system 100 includes at least a reader device 110 and a server 110. The system 100 facilitates providing cryptographic protection to a QR code 102. In some examples, the QR code 102 is a type of matrix barcode, which can also be referred to as a two-dimensional (2-D) barcode. The QR code 102 can encode various types of information, such as Uniform Resource Locators (URLs), Uniform Resource Identifiers (URIs), Uniform Resource Name (URN), e-mail addresses, phone numbers, Short Message Service (SMS), map locations, geographic information, business cards, virtual cards, pin numbers, links, configurations, calendars, and so on. The QR code 102 includes a shaded pattern (e.g., shaded square), the size, shape, and arrangement of which corresponds to various aspects of information. The pattern of the QR code 102 can be translated into the information (e.g., an URL) according to a suitable encoding standard (e.g., SPARQCode). The QR code 102 shown in FIG. 1 encodes the URL, for example. The QR code 102 is read and executed using a QR code scanner on devices, such as a reader device 110. The QR code 102 can be protected using cryptographic solutions as described herein.

In some arrangements, the bar code (e.g., the QR code 102) can be generated by a QR code generator 106. In some examples, the generator 106 can include a merchant computing system, a Code Service Provider (CSP) computing system or a Payment Service Provider (PSP) computing system (e.g., an Acquirer in U.S. payment system) of the merchant computing system, and so on that can display the QR code 102 via a display screen or a printed medium for the reader device 110 to scan. Accordingly, the QR code 102 can be generated by the payee or merchant side, in which case the reader device 110 is a payor or customer device. In some examples, the generator 106 can include a payer computing system, a CSP computing system or a PSP computing system (e.g., an Issuer in U.S. payment system) of the payer computing system, and so on that can display the QR code 102 via a display screen or a printed medium. Accordingly, the QR code 102 can be generated by the payor or customer side, in which case the reader device 110 is a payee or merchant side device.

Each of the reader device 110 and the server 130 is a computing system having processing, storage, and networking capabilities. In some arrangements, each of reader device 110 and the server 130 can be Internet-connected or network-connected computing devices e.g., computers, servers, mobile devices, datacenters, smartphones, smart wearables, etc. Each of the reader device 110 and the server 130 can include any type of device or system configured to execute one or more software applications. Each of the reader device 110 and the server 130 can include an operating system (e.g., Windows®, Linux®, macOS®, etc.) on which the software applications can be executed.

The reader device 110 and the server 130 can transfer communications, data, information, messages, certificates, and so on, using the network 105. The network 105 is any suitable Local Area Network (LAN), Wide Area Network (WAN), or a combination thereof. For example, the network 105 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee®, Bluetooth®, Wi-Fi®, any suitable wired network, combination thereof, and/or the like. The network 105 is structured to permit the exchange of data, values, instructions, messages, and the like.

In some arrangements, the reader device 110 includes a processing circuit 112 having a processor 114 and a memory 116. The processor 114 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 116 (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory 116 is or includes tangible, non-transient volatile memory or non-volatile memory. Accordingly, the memory 116 includes database components, object code components, script components, or any other type of information structure for supporting the various activities and information structures described herein. The processing circuit 112 can be used to implemented one or more of the circuits 118, 120, and 122.

The network interface circuit 118 is configured for and structured to establish a connection and communicate with the server 130 via the network 105. The network interface circuit 118 is structured for sending and receiving data over a communication network (e.g., the network 105). Accordingly, the network interface circuit 118 includes any of a cellular transceiver (for cellular standards), wireless network transceiver (for 802.11X, ZigBee, Bluetooth, Wi-Fi, or the like), wired network interface, or a combination thereof. For example, the network interface circuit 118 may include wireless or wired network modems, ports, baseband processors, and associated software and firmware.

The QR code reader 120 is structured to read and decode the QR code 102. The QR code reader 120 can include suitable hardware for reading, scanning, or capturing the QR code. For example, the QR code reader 120 can include camera, scanner, an active-pixel sensor, an image sensor, a Charge Coupled Device (CCD) sensor, a Complementary Metal Oxide Semiconductor (CMOS sensor), and so on. The QR code reader 120 can include suitable software and firmware that decode the output scanned from the QR code 102 into readable or consumable information (referred to as "decoded information") such as URLs, URIs, URN, e-mail addresses, phone numbers, SMS, map locations, geographic information, business cards, virtual cards, pin numbers, links, configurations, calendars, and so on.

The application circuit 122 can be used to execute one or more applications or software on the reader device 110 in which the decoded information can be used. For example, the application circuit 122 can execute one or more applications that can use the decoded information for authentication, verification, multimedia, financial services, payments, connecting to a particular website or server, tracing, and so on. For example, the application circuit 122 can execute a mobile banking application, a browser, a mobile banking application, a mobile wallet, and so on. In some arrangements, the application circuit 122 can execute one or more applications that can use or consume the cryptographically protected information (e.g., one or more of the enveloped data 142, the signed data 144, the encrypted data 146, the TST 148, and the signcrypted data 150), in the examples in which the reader device 110 is a respective one of the receivers 160, 162, 164, 168, the relying party 166, or the relaying party 170. In such examples, the server 130 can provide the cryptographically protected data back to the reader device 110 via the network 105, in response to the reader device 110 accessing the at least one link encoded in the QR code 102.

In some arrangements, the server 130 includes a processing circuit 132 having a processor 134 and a memory 136. The processor 134 is implemented as a general-purpose processor, an ASIC, one or more FPGAs, a DSP, a group of processing components, or other suitable electronic processing components. The memory 136 (e.g., RAM, ROM, NVRAM, Flash Memory, hard disk storage, etc.) stores data and/or computer code for facilitating the various processes described herein. Moreover, the memory 136 is or includes tangible, non-transient volatile memory or non-volatile memory. Accordingly, the memory 136 includes database components, object code components, script components, or any other type of information structure for supporting the various activities and information structures described herein. The processing circuit 132 can be used to implemented one or more of the circuits 138 and 140.

The network interface circuit 138 is configured for and structured to establish a connection and communicate with the reader device 110 via the network 105. The network interface circuit 138 is structured for sending and receiving data over a communication network (e.g., the network 105). Accordingly, the network interface circuit 138 includes any of a cellular transceiver (for cellular standards), wireless network transceiver (for 802.11X, ZigBee, Bluetooth, Wi-Fi, or the like), wired network interface, or a combination thereof. For example, the network interface circuit 138 may include wireless or wired network modems, ports, baseband processors, and associated software and firmware.

The database 140 can store data, metadata, or information (referred to as cryptographically protected information) corresponding to or associated with various QR codes, including the QR code 102. For example, the database 140 can store enveloped data 142, signed data 144, encrypted data 146, at least one TST 148, and signcrypted data 150 corresponding to or associated with each of QR codes, including the QR code 102. For example, the cryptographically protected information stored in the database 140 can be accessible using at least one link obtained from reading and decoding the QR code 102. That is, the reader device 110 can obtain at least one link to the stored cryptographically protected information in the database 140 by reading and decoding the QR code 102. Accordingly, the server 130 can support a site (e.g., a merchant site, a manufacturing site, and so on) that stores and protects the cryptographically protected information accessible by the QR code 102. Each of the enveloped data 142, the signed data 144, the encrypted data 146, the TST 148, and signcrypted data 150 can be generated according to CMS methods described herein, including Signed Data and Tokenization as the Signed Data.

In some examples, one link encoded by the QR code 102 can be used to access all or two or more of the cryptographically protected information, including the enveloped data 142, the signed data 144, the encrypted data 146, the TST 148, and signcrypted data 150. That is, one link encoded by the QR code 102 can be used to access a set of different types of cryptographically protected information. In some examples, each of the enveloped data 142, the signed data 144, the encrypted data 146, the TST 148, and signcrypted data 150 is accessible using one of multiple links encoded by the QR code 102.

In some arrangements, the enveloped data 142 contains encrypted data (e.g., encrypted receiver information) for multiple receivers such as the receivers 160, 162, and 164. The receiver information can include key management material (e.g., keys, certificates, restricted data, secrets, etc.). The receiver information can be decrypted by or decrypted only by the designated receiver. For example, the enveloped data 142 can include encrypted keys generated by encrypting a key management material (e.g., a random Advanced Encryption Standard (AES) key) using a public key of each of the multiple receivers 160, 162, and 164. For example, a first encrypted key can be generated by encrypting the AES key using a public key of the receiver 160, a second encrypted key can be generated by encrypting the AES key using a public key of the receiver 162, and a third encrypted key can be generated by encrypting the AES key using a public key of the receiver 164. The enveloped data 142 is detached from the QR code 102 itself. That is, the data read from the QR code 102 itself does not include the enveloped data 142.

The QR code reader can be one or more of the receivers 160, 162, or 164 in some examples. For example, the reader device 110 can be one or more of the receivers 160, 162, or 164, or an application running the application circuit 122 can be each of the receivers 160, 162, or 164. In some examples, one or more of the receivers 160, 162, and 164 are third-party systems to which the enveloped data 142 is sent for further processing. In some examples, the enveloped data 142 for each of the receivers 160, 162, and 164 is accessible using one of multiple links encoded by the QR code 102. In some examples, the enveloped data 142 for all of the receivers 160, 162, and 164 is accessible using one of multiple links encoded by the QR code 102. In some examples, the enveloped data 142 for all of the receivers 160, 162, and 164, along with the rest of the cryptographically protected data, is accessible using one link encoded by the QR code 102.

In some arrangements, the signed data 144 (e.g., signed data object) can include a digital signature of the QR code 102. The signer provides the signature, and the relying party 166 can verify the signature. In some examples, the signer can be the relying party 166 or another suitable device or system. The digital signature can be used to verify the QR code 102, thus providing QR code integrity, QR code authentication, and QR code non-repudiation. In some examples, the content of the QR code 102 can be duplicated in the signed data 144, such that the signed data 144 includes both the digital signature of the QR code 102 and the content of the QR code 102 as a same message to be provided or sent to the relying party 166. The content of the QR code 102 can refer to the information encoded by the QR code 102, in some arrangements. In some examples, the signed data 144 can include a detached signature (e.g., a separated signature), which is a digital signature of the QR code 102 detached or separated from the content of the QR code 102. That is, the signed data 144 including the digital signature of the QR code 102 is sent to the relying party 166 in one message, and the content of the QR code 103 is sent to the relying party 166 in a separate message. In such examples, the relying party 166 can hash the content of the QR code 102 (stored by the relying party 166 or received via the separate message) and verify the digital signature of the signer included in the signed data 144 using signer information of the signer contained in the signed data 144. The signed data 144 can contain the signer certificate and the corresponding CA certificate chain to a trusted root CA for certificate chain validation.

CMS is a scheme for constructing cryptographically protected data, including data encryption, message authentication, digital signatures, and the corresponding key management supporting a sender device (e.g., the reader device 110) and one or more receiver devices (e.g., the relying party 166). CMS is defined in suitable standards such as ANSI standard X9.73 Cryptographic Message Syntax: ASN.1 and XML, IETF specification RFC 5652 CMS, and so on.

In some examples, the signed data can include message content, one or more signatures, and one or more sets of certificates and Certificate Revocation Lists (CRLs) that can be used in signature verification. For example, the format of the signed data 144 as specified in ASN.1 is shown in FIG. 2. For example, the signed data includes information such as a version ("Version"), a digest algorithm ("digestAlgorithm"), encapsulated content information ("encapContentInfo"), certificates ("certificates"), CRLs ("crls"), and signer information ("signerInfos"). The value in the version field ("CMSVersion") indicates a version of the CMS used for the signed data. The value in the digest algorithm field ("DigestAlgorithmIdentifiers") identifies a set of at least one message digest algorithm used by the signer. The value in the encapsulated content information field ("EncapsulatedContentInfo") includes the signed content, including the content type identifier and in some examples, the content itself. The value in the certificate field ("Certificates") includes one or more sets of certificates. The value in the CRL field ("CRLs") includes one or more CRLs. The value in the signer information field ("SignerInfos") includes information about at least one signatory or signer who has signed the signed content in the encapsulated content information. The value in the signed information field includes the actual digital signature (e.g., the signature value) and other signer-specific information.

In some examples, an eContentype component of encapsulated content information is an information object identifier indicating the type of content. When present, the eContentype component contains the message content. The eContentype component may be absent to allow construction of detached signatures, and in the examples in which the eContent value of the eContentype component is absent, the signer calculates the signature on the message content as though the eContent value were present.

Detached signature (e.g., Detached SignedData signatures) are signatures that are conveyed separately from the content in a value of the encapsulated content information. That is, although the signed content is provided, the signature used to sign the content is provided separately, in a different message. As with the other CMS types, the content (e.g., the eContent component of the encapsulated content information) is optional and need not be included in a message. This allows the content to be conveyed separately from a value of the signed data, with the application maintaining the connection between the content and the signature(s). For example, applications can convey the content as one Multipurpose Internet Mail Extensions (MIME) body part, and the signature(s) as another. This allows a recipient to process the content while ignoring the signature body part if the application is not capable of signature verification. As discussed, the signed data 144 can include a detached signature for the content of the QR code 102.

FIG. 3 illustrates a format of the signer information for two or more signers and signatures. For each of signers 0, 1, . . . , MAX, the signer information includes information such as a version ("Version"), a signer ID (Sid), a digest algorithm ("digestAlgorithm"), one or more signed attributes ("signedAttrs"), a signature algorithm (signatureAlgorithm"), a signature ("signature"), and one or more unsigned attributes ("unsignedAttrs). The value in the version field ("CMSVersion") indicates a version of the CMS used for each of the signers 0, 1, . . . , MAX. The value in the signer ID field ("SignerIdentifier") identifies each of the signers 0, 1, . . . , MAX. The value in the digest algorithm field ("DigestAlgorithmIdentifier") identifies a set of at least one message digest algorithm used by each of signers 0, 1, . . . , MAX. The value in the signed attributes field ("SignedAttributes") indicates one or more attributes or attribute types (e.g., content-type attribute, message-digest attribute, and so on) that are signed. The value in the signature algorithm field ("SignatureAlgorithmIdentifier") identifies a signature algorithm used by each of signers 0, 1, . . . , MAX. The value in the signature field ("Signature Value") includes the actual digital signature (e.g., the signature value). The value in the unsigned attributes field ("UnsignedAttributes") includes one or more attributes or attribute types (e.g., countersignature, and so on) that are not signed.

In some arrangements, the encrypted data 146 includes encrypted data that can be decrypted by or decrypted only by a designated receiver such as the receiver 168. The receiver 168 can receive the encrypted data 146 from the server 130. For example, the encrypted data 146 can include data (e.g., identifiers, tokens, or other suitable information) encrypted using a public key of the receiver 168, so that the receiver 168 can decrypt the encrypted data 146 upon receiving the same. The receiver 168 can be the QR code reader itself (e.g., the reader device 110), or a third-party system for the QR code reader sends for further processing (e.g. authorization, billing, settlement, etc.). As such, the encrypted data 146 is detached from the QR code 102 itself. That is, the data read from the QR code 102 itself does not include the encrypted data 146.

The TST 148 can be provided to a relying party 170, which can be the reader device 110 or another suitable device or system. In some arrangements, a requestor (e.g., the server 130 or another suitable device or system) sends hashed content of the QR code 102 to a Time Stamp Authority (TSA) and receives the TST from the TSA. The requestor can provide or send the original data (e.g., the content of the QR code 102) and the TST to a relying party 170 for verification. The TSA can generate the TST 148 by running the hashed content of the QR code 102 through a TST function. The TSA does not have access to the original content of the QR code 102. The TST function can create a TST by appending a timestamp from a calibrated clock to the respective hashed content of the QR code 102 and generating a cryptographic signature, such as a digital signature, a Message Authentication Code (MAC), an Hash-based Message Authentication Code (HMAC), or a hash chain over the timestamp appended to the content of the QR code 102. The cryptographic signature can be verified by the relying party 170 to determine integrity provable to a trusted time indicated by the TST 148. In some examples, the TST 148 can be generated using one or more TST mechanisms including 1) Digital Signature Method, 2) MAC Method, 3) Linked Token Method, 4) Linked and Signed Method, and 5) Transient Key Method. Linked Token Method uses a MAC for the TST cryptographic signature while the Linked and Signed Method uses a digital signature for the TST cryptographic signature. Both methods create a chain of TST linked together using a hash algorithm. The Transient Key Method uses Elliptic Curve Digital Signature Algorithm (ECDSA) to sign each TST and changes the signature key on a regular interval and manages the ECDSA signature keys using an internal key chain. The TST 148 is detached from the QR code 102 itself. That is, the data read from the QR code 102 itself does not include the TST 148.

ANSI X9.95 defines requirements and methodologies for a TSA to issue a TST. Unlike legacy timestamps which rely on synchronized clocks, TSA use calibrated clocks aligned with a National Measurement Institutes (NMI) and the International Time Authority (ITA). The Bureau International des Poids et Mesures (BIPM) near Paris, France is the official ITA that calibrates the clocks of each NMI. The two NMI in the USA is the NIST Time and Frequency Division that manages the F1 Cesium Fountain Atomic Clock and the United States Naval Observatory (USNO) which manages the Global Positioning System (GPS).

In some arrangements, the signcrypted data 150 (e.g., signcrypted data object) can include a signcrypted content of the QR code 102. A signer can signcrypt the content of the QR code, and the relying party 172 can decrypt verify the signcrypted content in a single cryptographic step. In some examples, the signer can be the relying party 172 or another suitable device or system. The signcrypted content can be used to verify the QR code 102, thus providing QR code integrity, QR code authentication, and QR code non-repudiation. In some examples, the content of the QR code 102 can be duplicated in the signcrypted data 150, such that the signcrypted data 150 includes both the signcrypted content of the QR code 102 and the content of the QR code 102 as a same message to be provided or sent to the relying party 172. The content of the QR code 102 can refer to the information encoded by the QR code 102, in some arrangements. In some examples, the signcrypted data 150 can be detached or separated from the content of the QR code 102. That is, the signcrypted data 150 including the signcrypted content of the QR code 102 is sent to the relying party 172 in one message, and the content of the QR code 103 is sent to the relying party 172 in a separate message.

In some arrangements, one or more of the receivers 160, 162, 164, and 168, the relying party 166, and the relying party 170 can be a device with suitable processing and network capabilities. For example, each of one or more of the receivers 160, 162, 164, and 168, the relying party 166, and the relying party 170 can include a processing circuit (such as those described herein) having at least one processor and at least one memory for processing information. Each of the receivers 160, 162, 164, and 168, the relying party 166, and the relying party 170 includes a network interface circuit (such as those described herein) to communicating with the server 130 via the network 105 or another suitable network. In some examples, one or more of the receivers 160, 162, 164, and 168, the relying party 166, and the relying party 170 can be an application running on a device (e.g., the reader device 110 or another receiver device different from the reader device 110).

In some examples, one or more of the receivers 160, 162, 164, and 168, the relying party 166, and the relying party 170 can include an application circuit used to execute one or more applications or software that can use or consume the cryptographically protected information (e.g., one or more of the enveloped data 142, the signed data 144, the encrypted data 146, the TST 148, and the signcrypted data 150). In such examples, the server 130 can provide the cryptographically protected data to the one or more of the receivers 160, 162, 164, and 168, the relying parties 166, 170, and 172 via the network 105 or another suitable connection or link, in response to the reader device 110 accessing the link encoded in the QR code 102.

While various circuits, interfaces, and logic with particular functionality are shown, it should be understood that each of the computing systems 110, 130, 160, 162, 164, 166, 168, and 170 includes any number of circuits, interfaces, and logic for facilitating the operations described herein. For example, the activities of multiple circuits are combined as a single circuit and implemented on the same processing circuit (e.g., the processing circuit), as additional circuits with additional functionality are included.

Figure 4:
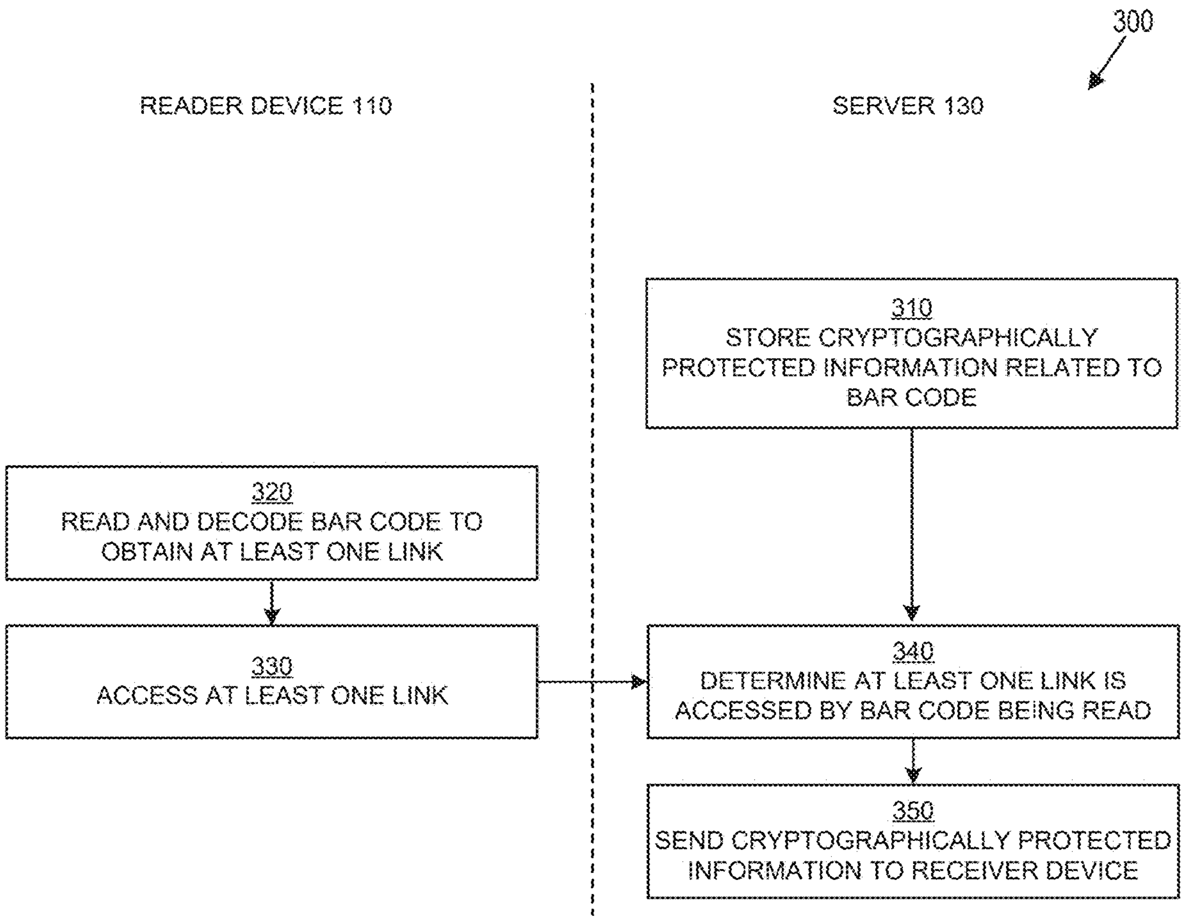
FIG. 4 is a flowchart diagram illustrating a method for providing cryptographic protection for QR codes, according to some arrangements.

FIG. 4 is a diagram illustrating an example method 400 for providing cryptographic protection for QR codes, according to some arrangements. The method 400 can be performed by the system 100, including the reader device 110 and the server 130. The method 400 can provide cryptographic protection of QR code content and provide cryptographic protection of extended QR code content. Further, given that the cryptographically protected information is stored in the database 140 on the server 130 instead of being encoded by the QR code 102 and that larger amount of encoded information leads to a larger QR code size, the method 400 provides cryptographic protection without inflating the QR code size and without affecting existing QR code readers. The method 400 can be employed in Know Your Customer (KYC) enrollment and Multifactor Authentication (MFA).

At 310, the server 130 stores the cryptographically protected information related to a bar code, for example, in the database 140. The bar code includes a 2-D bar code, in some examples. In some examples, the bar code includes a QR code. The bar code can refer to any graphically presented pattern that can be read or scanned by a reader, scanner, or camera, such that the pattern can encode information (e.g., the at least one link) such as text strings, American Standard Code for Information Interchange (ASCII) data, and so on according to any suitable standard. The cryptographically protected information can be accessible via at least one link. The bar code is configured to be read by the reader device 110 (with the reader 120), and the at least one link is configured to be accessed by the reader device 110.

The cryptographically protected information can include CMS-based objects, including one or more of the enveloped data 142, the signed data 144, the encrypted data 146, the TST 148, or the signcrypted data 150. In some examples, the bar code can be dynamically generated with the cryptographically protected information. For example, the QR code 102 encoding at least one link to the enveloped data 142 can be generated to associate with the receiver information (e.g., key management material or another type of information) and/or the encrypted receiver information. The QR code 102 encoding at least one link to the signed data 144 can be generated, and the content of the QR code 102 can be signed to generate the digital signature included in the signed data 144. The QR code 102 encoding at least one link to the encrypted data 146 can be generated to associate with the data and/or the encrypted data. The QR code 102 encoding at least one link to the TST 149 can be generated, and the content of the QR code 102 is used (e.g., hashed) to generate the TST 149 in the manner described. The QR code 102 encoding at least one link to the signcrypted data 150 can be generated, and the content of the QR code 102 can be signcrypted to generate the signcrypted data 150.

At 320, the reader device 110 reads and decodes the bar code to obtain the at least one link. The bar code can be displayed on a screen of a device or printed on a suitable medium to be read and scanned by the reader 120. The reader device 110 can obtain the at least one link (e.g., at least one URL, URI, URN, and so on) by decoding the bar code. As described herein, the bar code can be generated by the generator 106.

At 330, the reader device 110 accesses the at least one link using the network interface circuit 118. At 340, the server 130 determines that the at least one link is accessed based on the bar code being read by for example determining that the reader device 110 accesses the at least one link. At 350, the server 130 sends the cryptographically protected information to a receiver device (e.g., one or more of the receivers 160, 162, 164, 168, the relying party 166, or the relaying party 170). In some examples, the receiver device includes at least one of the receivers 160, 162, and 164 of the enveloped data 142, the relying party 166 of the signed data 144, the receiver 168 of the encrypted data 146, the relying party 170 of the TST 148, the relying party 172 of the signcrypted data 150, the generator 106 configured to generate the QR code 102, the reader device 110 configured to read the QR code 102, or another suitable device or system different from any of the foregoing devices. In some examples, the receiver device can include the reader device 110, which may forward the cryptographically protected information received from the server 130 to another device.

In some examples, the cryptographically protected information includes the enveloped data 142 configured to be accessible by the at least one link. The receiver device includes a first receiver device (e.g., receiver 160) and a second receiver device (e.g., the receiver 162). The enveloped data 142 includes first encrypted receiver information generated by encrypting the receiver information using a first key of the first receiver device and second encrypted receiver information generated by encrypting the same receiver information using a second key of the second receiver device. The receiver information includes a key management material. Sending the cryptographically protected information to the receiver device at 350 includes sending the first encrypted receiver information to the first receiver device and sending the second encrypted receiver information to the second receiver device. In some examples, the first receiver device includes the reader device 110 configured to read the bar code and configured to access the at least one link of the bar code.

In some examples, the cryptographically protected information includes the signed data 144. The signed data includes a signature of a content of the bar code. In some examples, the signature includes a detached signature that is detached from the content of the bar code. Sending the cryptographically protected information to the receiver device at 350 includes comprises sending the signed data to the relying party 166, which can be the reader device 110 or another device.

In some examples, the cryptographically protected information includes the encrypted data 146 configured to be accessible by the at least one link. The encrypted data is generated by encrypting data using a key of the receiver device (e.g., the receiver 168). In some examples, the receiver device includes the reader device 110 configured to read the bar code and configured to access the at least one link of the bar code.

In some examples, the cryptographically protected information includes the TST 148. Sending the cryptographically protected information to the receiver device at 350 includes sending the TST 148 to the relying party 170.

In some examples, the cryptographically protected information includes the signcrypted data 150. Sending the cryptographically protected information to the receiver device at 350 includes sending the signcrypted data 150 to the relying party 172.

In some examples, the bar code and the associated cryptographically protected data have the same Time-To-Live (TTL), such as 30 seconds, 1 minute, 5 minutes, 1 hour, 2 hours, 24 hours, 48 hours, 1 week, 1 month, and so on. In response to the expiration of the TTL, the generator 106 (e.g., the server 130 or another suitable system) can regenerate the bar code to associate with the enveloped data 142 or the encrypted data 146, and generate the bar code and the signed data 144, the TST 148, and the signcrypted data 150 associated with the newly generated bar code.

As utilized herein, the terms "approximately," "substantially," and similar terms are intended to have a broad meaning in harmony with the common and accepted usage by those of ordinary skill in the art to which the subject matter herein pertains. It should be understood by those of ordinary skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope recited in the appended claims.

Although only a few arrangements have been described in detail herein, those skilled in the art will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope herein.

The arrangements described herein have been described with reference to drawings. The drawings illustrate certain details of specific arrangements that implement the systems, methods and programs described herein. However, describing the arrangements with drawings should not be construed as imposing any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope as defined in the appended claims. Such variations will depend on the machine-readable media and hardware systems chosen and on designer choice. It is understood that all such variations are within the scope herein. Likewise, software and web arrangements herein could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit to the precise form disclosed, and modifications and variations are possible in light of the above teachings or may be acquired. The arrangements were chosen and described in order to explain the principals and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope as expressed in the appended claims.

What is claimed is:

1. A method, comprising:

storing, by a server, cryptographically protected information related to a bar code, the cryptographically protected information comprising cryptographic objects being accessible via at least one link to the cryptographically protected information by a reader device, the cryptographically protected information being different from the bar code, wherein the cryptographic objects comprise at least three Cryptographic Message Syntax (CMS) objects generated from and cryptographically protecting content of the bar code, wherein each of the at least three CMS objects are detached from the content of the bar code and comprise a distinct data type selected from enveloped data, signed data, encrypted data, or a Time-Stamped Token, and wherein the at least one link provides access to each distinct data type of the at least three CMS objects;

after storing the cryptographically protected information, determining, by the server, that the at least one link is accessed by the bar code being read by the reader device, wherein a QR code encodes the at least one link to the cryptographically protected information; and in response to determining that the at least one link is accessed, triggering the cryptographically protected information to be sent to a receiver device, comprising sending, by the server to the receiver device, the cryptographically protected information;

wherein the bar code and the cryptographically protected information have a shared time-to-live (TTL), and wherein in response to expiration of the shared TTL, the server is configured to regenerate the bar code and the cryptographically protected information comprising the at least three CMS objects.

2. The method of claim 1, wherein the bar code comprises a two-dimensional bar code.

3. The method of claim 1, wherein the receiver device comprises at least one of a receiver of the enveloped data, a receiver of the signed data, a relying party of the encrypted data, a relying party of the Time-Stamped Token, a generator configured to generate the bar code, or a reader device configured to read the bar code.

4. The method of claim 1, wherein the bar code is read by a reader device, and the at least one link is accessed by the reader device.

5. The method of claim 1, wherein the cryptographically protected information comprises the enveloped data accessible by the at least one link;

the receiver device comprises a first receiver device and a second receiver device; and the enveloped data comprises:

first encrypted receiver information generated by encrypting receiver information using a first key of the first receiver device; and second encrypted receiver information generated by encrypting the receiver information using a second key of the second receiver device, the receiver information comprises a key management material.

6. The method of claim 5, wherein sending the cryptographically protected information to the receiver device comprises sending the first encrypted receiver information to the first receiver device and sending the second encrypted receiver information to the second receiver device.

7. The method of claim 5, wherein the first receiver device comprises a reader device configured to read the bar code and configured to access the at least one link of the bar code.

8. The method of claim 1, wherein the cryptographically protected information comprises the encrypted data accessible by the at least one link; and the encrypted data is generated by encrypting data using a key of the receiver device.

9. The method of claim 8, wherein the receiver device comprises a reader device configured to read the bar code and configured to access the at least one link of the bar code.

10. The method of claim 1, wherein the cryptographically protected information comprises the signed data;

the signed data comprises a signature of a content of the bar code.

11. The method of claim 10, wherein the signature comprises a detached signature that is detached from the content of the bar code.

12. The method of claim 10, wherein sending the cryptographically protected information to the receiver device comprises sending the signed data to a relying party.

13. The method of claim 1, wherein the cryptographically protected information comprises the Time-Stamped Token (TST).

14. The method of claim 13, wherein sending the cryptographically protected information to the receiver device comprises sending the TST to a relying party.

15. The method of claim 1, wherein the cryptographically protected information is generated using Cryptographic Syntax Message (CMS).

16. The method of claim 1, wherein the cryptographically protected information comprises signcrypted data; and sending the cryptographically protected information to the receiver device comprises sending the signcrypted data to a relying party.

17. A system, comprising:

a processing circuit comprising a processor and a memory, the processing circuit configured to:

store cryptographically protected information related to a bar code, the cryptographically protected information comprising cryptographic objects being accessible via at least one link to the cryptographically protected information by a reader device, the cryptographically protected information being different from the bar code, wherein the cryptographic objects comprise at least three Cryptographic Message Syntax (CMS) objects generated from and cryptographically protecting content of the bar code, wherein each of the at least three CMS objects are detached from the content of the bar code and comprise a distinct data type selected from enveloped data, signed data, encrypted data, or a Time-Stamped Token, and wherein the at least one link provides access to each distinct data type of the at least three CMS objects;

after storing the cryptographically protected information, determine that the at least one link is accessed by the bar code being read by the reader device, wherein a QR code encodes the at least one link to the cryptographically protected information; and in response to determining that the at least one link is accessed, trigger the cryptographically protected information to be sent to a receiver device, comprising sending to a receiver device the cryptographically protected information;

wherein the bar code and the cryptographically protected information have a shared time-to-live (TTL), and wherein in response to expiration of the shared TTL, the processing circuit is configured to regenerate the bar code and the cryptographically protected information comprising the at least three CMS objects.

18. The system of claim 17, wherein the cryptographically protected information is generated using Cryptographic Syntax Message (CMS).

19. A non-transitory computer-readable medium comprising processor-readable instructions such that, when executed causes a processor to:

store cryptographically protected information related to a bar code, the cryptographically protected information comprising cryptographic objects being accessible via at least one link to the cryptographically protected information by a reader device, the cryptographically protected information being different from the bar code, wherein the cryptographic objects comprise Cryptographic Message Syntax (CMS) objects generated from and cryptographically protecting content of the bar code, wherein each of the at least three CMS objects are detached from the content of the bar code and comprise a distinct data type selected from enveloped data, signed data, encrypted data, or a Time-Stamped Token, and wherein the at least one link provides access to each distinct data type of the at least three CMS objects;

after storing the cryptographically protected information, determine that the at least one link is accessed by the bar code being read by the reader device, wherein a QR code encodes the at least one link to the cryptographically protected information; and in response to determining that the at least one link is accessed, trigger the cryptographically protected information to be sent to a receiver device, comprising sending to a receiver device the cryptographically protected information;

wherein the bar code and the cryptographically protected information have a shared time-to-live (TTL), and wherein in response to expiration of the shared TTL, processor-readable instructions further cause the processor to regenerate the bar code and the cryptographically protected information comprising the at least three CMS objects.

* * * * *